United States Patent [19]
Ebner et al.

[11] Patent Number: 6,078,853
[45] Date of Patent: Jun. 20, 2000

[54] VEHICLE AIR CONDITIONING MONITORING DEVICE

[75] Inventors: Andreas Ebner, Stuttgart; Wolfgang Henseler, Tuebingen; Juergen Heuberger, Pliezhausen; Alfred Jeckel, Rottenburg; Jan Martin, Sindelfingen, all of Germany

[73] Assignee: DaimlerChrysler AG, Stuttgart, Germany

[21] Appl. No.: 09/061,152

[22] Filed: Apr. 16, 1998

[30] Foreign Application Priority Data

Apr. 16, 1997 [DE]  Germany ............................ 197 15 748

[51] Int. Cl.⁷ ...................................................... G06F 7/00
[52] U.S. Cl. ................................. 701/36; 701/10; 701/65; 340/425.5; 340/438; 374/10; 374/20
[58] Field of Search .................................. 701/1, 10, 36, 701/45, 65; 374/10, 20, 100, 133; 340/425.5, 438, 463, 426, 439; 62/156, 159, 213, 223, 132, 133, 239, 244; 123/339.17

[56] References Cited

U.S. PATENT DOCUMENTS

| 4,598,797 | 7/1986 | Schultz ..................................... 187/223 |
| 4,761,967 | 8/1988 | Sumikawa et al. ........................ 62/201 |
| 5,826,439 | 10/1998 | Baruschke et al. ........................ 62/215 |

FOREIGN PATENT DOCUMENTS 195 09 495  of 0000  Germany.

OTHER PUBLICATIONS

R. Burk, H.–J. Krauss, and M. Loehle, "Integral Air Conditioning System for Electric Automobiles," ATZ Automobiltechnische Zeitschrift, vol. 94, No. 11, 1992, p. 582–588.

*Primary Examiner*—William A. Cuchlinski, Jr.
*Assistant Examiner*—Gertrude Arthur
*Attorney, Agent, or Firm*—Evenson, McKeown, Edwards & Lenahan, P.L.L.C.

[57] ABSTRACT

A device for use in vehicles with electric or hybrid drive for monitoring the air conditioning of a vehicle based on health and energy consumption readings. The device monitors the operation of the air conditioning to determine when differentials between outside and inside temperature are excessive, and/or inside atmospheric humidity is too low and/or air quality is poor. An occurrence of any of these conditions results in the system suggesting to the driver that he should interrupt travel to the desired destination. In addition, if necessary, the device performs a vehicle range estimate as a function of the selected air conditioning operation.

7 Claims, 1 Drawing Sheet

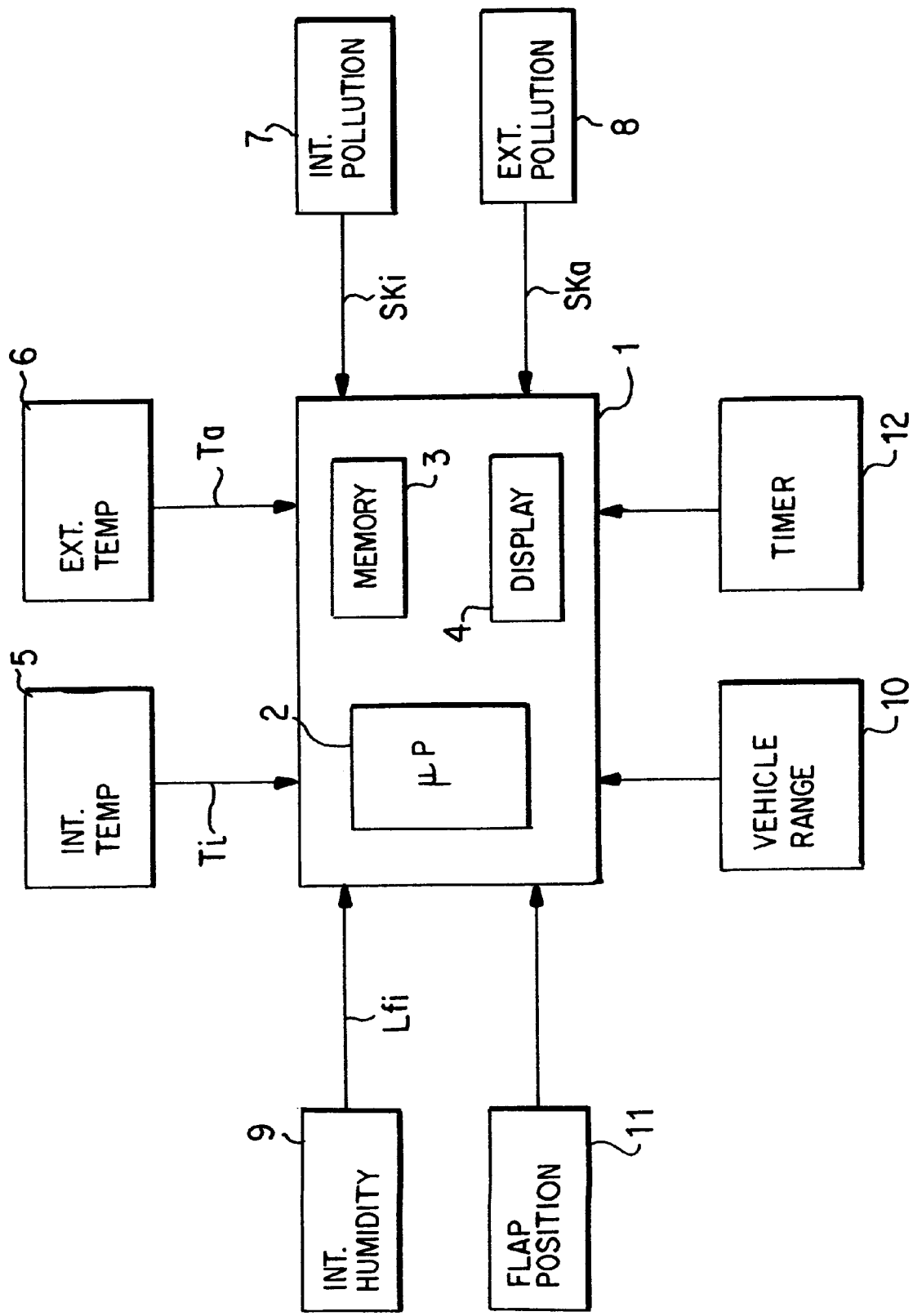

VEHICLE AIR CONDITIONING MONITORING DEVICE

BACKGROUND AND SUMMARY OF THE INVENTION

This application claims the priority of German application 197 15 748.3, filed Apr. 16, 1997, the disclosure of which is expressly incorporated by reference herein.

The present invention relates to a device for monitoring the air conditioning of a motor vehicle. The device is advantageously used, for example, in motor vehicles with electric or hybrid drives. The term "air conditioning," for the sake of simplicity, will be understood in this document to refer both to the function of a simple heating system, as well as the function of an air conditioning system with both heating and cooling functions.

Modern vehicle air conditioning systems of today are usually controlled by complicated electronics (in accordance with the selection of various input parameters, such as the required interior temperature and the blower speed), and then regulated electronically. Air conditioning comfort is a significant importance in such systems. An air conditioning system of this type, which is especially suitable for electric vehicles as well, is described in the article by R. Burk, H.-J. Krauβ, and M. Löhle entitled "Integral Air Conditioning System for Electric Automobiles," ATZ Automobiltechnische Zeitschrift, volume 94, No. 11, 1992, page 582.

In German patent document DE 195 09 495 C1, a method for controlling the ventilation of a vehicle interior is disclosed which is concerned, in particular, with switching automatically between regulating fresh air and regulating recirculated air. This document discloses a method of interrupting air recirculation regulation by fresh air operating phases (even if additional regulation recirculation conditions are provided), in order to prevent the vehicle windows from fogging and to prevent the interior of the vehicle from being deprived of oxygen. The switch between fresh air and recirculated air operation can be made as a function of the operating state of an associated air conditioning system, the set difference between the outside temperature and the inside temperature and/or the vehicle speed. It is also known from this article, in conjunction with the additional prior art cited therein, that the switch between regulating fresh air and recirculated air can be made as a function of the pollutant concentration inside and outside the vehicle. Here, the respective pollutant concentration is detected via a suitably positioned pollutant sensor. With a higher pollutant concentration outside, the regulation of recirculated air is activated and, as an additional measure, a provision can be made to switch back to regulating fresh air when the pollutant concentration inside the vehicle is higher than the pollutant concentration outside the vehicle.

As a result of the comfort-oriented design of modern air conditioning systems and their operating interfaces, the user is frequently unaware of the extent to which heating and/or air conditioning affects fuel consumption and the health of the occupants. Economical fuel consumption plays a particular role (as far as the range of the vehicle in concerned), especially in vehicles with electric or hybrid drives. One health-relevant aspect (for example) is that when an inside temperature setpoint is selected by the user that differs considerably from the outside temperature, health problems can develop (for example colds, dried-out mucous membranes, and so on).

Hence, it is an object of the present invention to provide a vehicle air conditioning monitoring device which is able to monitor the vehicle air conditioning (based on health and fuel-consumption conditions) and to inform the user of the corresponding state of the air conditioning.

This and other objects and advantages are achieved by providing a vehicle air conditioning monitoring device which serves (in particular) to avoid adverse effects on the health of the vehicle occupants as a result of a temperature in the vehicle interior that differs excessively from the outside temperature. To accomplish this, the monitoring device calculates the difference between the outside temperature and the inside temperature (each detected by sensors), and compares them with a preset temperature differential warning value. The warning value can variably be set via corresponding curves that can depend on other parameters, for example, atmospheric humidity and outside and inside temperature. If the difference between the measured temperatures exceeds this temperature differential warning value, the device provides corresponding temperature difference warning information to the user. This enable the user to react in a suitable manner in order to prevent undesirable health consequences.

In another embodiment of the present invention, the monitoring device is designed, in particular, for detecting a level of atmospheric humidity in the vehicle interior that is too low and therefore unhealthy. The monitoring device also further indicates the unhealthy environment to the user in an adequate amount of time (by generating corresponding atmospheric humidity warning information), so that the occupant can make the appropriate adjustments.

In yet another embodiment of the current invention, the vehicle air conditioning (based on the disadvantageous consequences of high pollutants) monitors concentrations of pollutants in the air which the vehicle occupants breathe. For this purpose, information about the pollutant concentrations inside and outside the vehicle are supplied by suitably positioned pollutant sensors. This information is usable (if necessary) in the conventional way to switch the air conditioning system to regulating recirculated air (with high pollutant concentrations outside), or to switch to regulating fresh air (with high pollutant concentrations) in the vehicle interior. In addition to switching between operating modes (i.e., fresh air or reciculated air), the monitoring device also uses the pollutant concentration information to generate information related to whether or not interrupting travel (when both pollutant concentrations are above a suitably preselected pollutant concentration warning value) is advisable. This travel interruption recommendation information indicates to the user that, in the present situation, interrupting the journey is recommended because the driving reliability of the driver can no longer be guaranteed because of, for example, high pollution concentrations in the air.

In still another embodiment if the present invention, the vehicle air conditioning monitoring device is specially designed for use in vehicles with electric or hybrid drives to determine the vehicle range remaining as a function of the interior temperature desired by the user. Vehicles of this type are traditionally designed for the lowest possible energy consumption, so that operation of the air conditioning system has a significant influence on the total energy balance of the vehicle. Considering this, the monitoring device provides the driver with information about the anticipated range of the vehicle by taking into account the influence of the operating state of the air conditioning system, the selected interior temperature setpoint, and the other range-relevant information, which it obtains from a vehicle system controller. This information includes, for example, information about the charge state of a storage device (for electrical energy for the vehicle drive), and/or the amount of fuel remaining.

Other objects, advantages and novel features of the present invention will become apparent from the following detailed description of the invention when considered in conjunction with the accompanying drawing.

BRIEF DESCRIPTION OF THE DRAWING

The sole FIGURE shows a schematic block diagram of a vehicle air conditioning monitoring device.

DETAILED DESCRIPTION OF THE DRAWING

Device 1 is used for monitoring the vehicle air conditioning system. In particular, device 1 is also advantageously used with vehicles having electric or hybrid drives, because in such vehicles (which are designed for the lowest possible energy consumption), the air conditioning makes a significant contribution to the overall energy consumption of the vehicle. Air conditioning monitoring device 1 assists the driver in setting the optimum operating state of the air conditioning system provided for the vehicle in the form of a heating or cooling system. For this purpose, device 1 has a microcontroller 2 as a central intelligent unit, a connected data storage memory 3 (in which various required characteristic parameters are stored), and a display unit 4.

Display unit 4, in addition to optimum additional indicating elements (such as an acoustic indicating element), comprises a visual indicating element (that preferably consists of a liquid crystal display) positioned in the vicinity of the dashboard. Alternatively, the visual indicating element can also be in the form of a display instrument that is added later. Moreover, air conditioning monitoring device 1 includes additional conventional components (not shown) for performing the functions explained below. In particular, monitoring device 1 is designed for receiving and transmitting data signals (which are evaluated or generated in microcontroller 2), from or to connected components of the vehicle electrical system. The components that are most important at the present time are shown in the Figure.

Thus, air conditioning monitoring device 1 receives in particular the output signals from various sensors relevant to air conditioning, i.e., information about temperature $T_i$ inside the vehicle from an interior temperature sensor 5, temperature $T_a$ outside the vehicle from an exterior temperature sensor 6, pollutant concentration $S_{ki}$ inside the vehicle from an interior pollutant sensor 7, about pollutant concentration $S_{ka}$ outside the vehicle from an exterior pollutant sensor 8, and atmospheric humidity $L_{fi}$ inside the vehicle from an atmospheric humidity sensor 9 or a window fogging detector. In addition, monitoring device 1 receives, among other things, signals relevant to the vehicle range from an electrical vehicle system control 10 like that which is conventionally used for such electric and hybrid vehicles. Additionally, it receives information about the current position of a recirculating flap (that can be adjusted by a motor or manually) from a corresponding recirculating air flap position sensor 11. Lastly, an external timer 12 is preferably provided that is connected to air conditioning monitoring device 1. Alternatively, the timer can also be integrated into air conditioning monitoring device 1.

Air conditioning monitoring device 1 performs a variety of functions that increase the comfort of the air conditioning for vehicle occupants. These functions are not integrated into conventional air conditioning systems, and are discussed in greater detail below. Thus, device 1 displays the temperature information it receives about outside temperature $T_a$ and inside temperature $T_i$ on the visual display element of display unit 4 (preferably as two bars displayed directly adjacent to one another). Monitoring device 1 also calculates the difference between outside temperature $T_a$ and inside temperature $T_i$ and generates temperature differential warning information, if this calculated temperature differential is greater than a preset temperature differential warning value.

The temperature differential warning information consists of, for example, the output of a visual alarm signal using display unit 4. The temperature differential warning value is preferably stored in memory 3 (in the form of corresponding characteristic curves) as a function of various climate parameters that take into account physiological and health factors. Thus, the temperature differential warning value can be variably set to depend, for example, on the values of the outside and/or inside temperature $T_a$, $T_i$ and/or the atmospheric humidity $L_{fi}$. As a result, the driver is warned of an extreme temperature setting when he sets an interior temperature setpoint that is over dependent on the prevailing outside temperature. Air conditioning that depends on such temperature differentials is undesirable because of the risk of health hazards, for example, catching colds or having dried mucous membranes.

During an additional function of the present invention, air conditioning monitoring device 1 displays, on display unit 4, the atmospheric humidity information $L_{fi}$ that it receives (as, for example, a percentage). It also compares this atmospheric humidity $L_{fi}$ (measured inside the vehicle) with a preset atmospheric humidity warning value. The atmospheric humidity warning value can be stored in characteristic curve form in memory 3 as a function of suitable air conditioning parameters. When the measured atmospheric humidity $L_{fi}$ falls below this atmospheric humidity warning value, device 1 generates atmospheric humidity warning information (in the form of a visual warning signal, for example) that is delivered by display unit 4. The driver is thus made aware of the fact that the air inside the vehicle is too dry.

In yet another function of the present invention, air conditioning monitoring device 1 performs a vehicle range estimate. The remaining distance that can be traveled with the amount of energy available aboard the vehicle (i.e., the vehicle range), is heavily dependent on the adjustments made by the user to the air conditioning system. This is because the amount of energy required for air conditioning the vehicle interior accounts for a significant portion of the total energy consumption of the vehicle (especially in electric and hybrid vehicles). In particular, the adjustments to the selected interior temperature setpoint, as well as the selected blower power, affect the total energy consumption of the vehicle. Knowing the air conditioning energy consumption, device 1 determines the remaining vehicle range to be expected, based on the current situation, the information about the settings of the air conditioning system made by the user, as well as the signals provided by the vehicle system control. The vehicle system control contains the rest of the data relevant to the range of the vehicle, for example, the charge state of a traction battery, and/or the available amount of fuel, the average energy consumption of the vehicle drive and other energy-consuming vehicle components. Device 1 displays the vehicle range thus estimated on display unit 4. The driver can then adjust the air conditioning system so that in the specific situation, he still has the vehicle range that he requires.

To keep pollutant concentrations in the air breathed by the vehicle occupants low, or to alert occupants when pollutant concentrations are too high, air conditioning monitoring device 1 compares the information it receives about pollutant concentration $S_{ka}$ outside and pollutant concentration $S_{ki}$ inside with a preset pollutant concentration warning value. When the pollutant concentration outside exceeds the warning value, device 1 issues a corresponding visual warning signal on display unit 4, so that the user can then reduce the supply of fresh air by, for example, switching the air conditioning system from regulating fresh air to regulating recirculated air. If a recirculation flap that can be adjusted by a motor is present, the switch to regulating recirculated air can (alternatively) be made automatically, and this can be indicated by device 1 through its display unit 4. For this purpose, device 1 receives information regarding the current position of the recirculated air flap from recirculated air flap position sensor 11.

In the case of consumption-optimized internal combustion engines, the pollutant concentration inside can also exceed the applicable warning value. This is because the air conditioning operates with a relatively high recirculated air operation component. This in turn, is due to the heating/cooling of the vehicle interior in this operating mode (favorable from an energy perspective) and because of engine heating being possibly too low. Air conditioning monitoring device 1 indicates this situation as well, by emitting a corresponding warning signal that tells the user to switch to fresh air, so that the user can switch the air conditioning system to fresh air regulation. Alternatively, fresh air regulation can be activated automatically and can once again be indicated by display unit 4.

In another feature of the monitoring function (with regard to pollutant concentrations), the air conditioning monitoring device continuously determines whether the pollutant concentration $S_{ka}$ outside and the pollutant concentration $S_{ki}$ inside exceed a preset warning value. This preset value can be set (for example) to be the same as the smaller of the two above-mentioned pollutant concentration warning values that are critical for switching between recirculated air and fresh air operation (or can be different from this value). If this is the case (indicating that the air quality both inside and outside the vehicle are equally poor), device 1 generates travel interruption recommendation information in the form of a corresponding signal that appears on display unit 4 and serves as a recommendation to the driver to interrupt the journey because the reliability of the driver's driving is no longer guaranteed (based on the poor air quality).

With coupled or integrated timer 12, air conditioning monitoring device 1 can fulfill desired functions (as required), as a function of a specific time that can be determined in advance. With reference to the embodiments described above, it is clear that the vehicle air conditioning monitoring device according to the invention performs (along with additional functions) the function of a warning system, as far as the vehicle interior air conditioning is concerned. The vehicle air conditioning monitoring device thus enables the user to use the heating or air conditioning system of the vehicle (i.e., a vehicle with an internal combustion engine or a vehicle with electric or hybrid drives) in an ecological and healthy manner. Here the corresponding functions, for example, the switch from fresh air regulation to recirculated air regulation, are performed both manually or automatically.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. The device for monitoring the air conditioning of a vehicle, wherein:
   the device calculates the difference between the temperature outside the vehicle as measured by an outside temperature sensor and the temperature inside the vehicle as measured by an interior temperature sensor, and generates temperature differential warning information when the calculated temperature differential is greater than a preset temperature differential warning value; and
   the device compares the outside air pollutant concentration measured by a first pollutant sensor and the inside air pollutant concentration measured by a second pollutant sensor with a preset pollutant concentration warning value and generates travel interruption recommendation information if both of the measured pollutant concentrations are above the predetermined pollutant concentration warning value.

2. The device for monitoring the air conditioning of a motor vehicle, according to claim 1, wherein the device receives data relevant to vehicle range from a vehicle system control and determines the anticipated vehicle range as a function of these data as well as the air conditioning system setting selected by the user.

3. The device for monitoring the air conditioning of a vehicle, wherein:
   the device compares the atmospheric humidity measured by an atmospheric humidity sensor inside the vehicle with a preset atmospheric humidity warning value and generates atmospheric humidity warning information when the measured atmospheric humidity is less than the preset atmospheric humidity warning value; and
   the device compares the outside air pollutant concentration measured by a first pollutant sensor and the inside air pollutant concentration measured by a second pollutant sensor with a preset pollutant concentration warning value and generates travel interruption recommendation information if both of the measured pollutant concentrations are above the predetermined pollutant concentration warning value.

4. The device for monitoring the air conditioning of a motor vehicle, wherein:
   the device calculates the difference between the temperature outside the vehicle as measured by an outside temperature sensor and the temperature inside the vehicle as measured by an interior temperature sensor, and generates temperature differential warning information when the calculated temperature differential is greater than a preset temperature differential warning value; and
   the device receives data relevant to vehicle range from a vehicle system control and determines the anticipated vehicle range as a function of these data as well as the air conditioning system setting selected by the user.

5. The device for monitoring the air conditioning of a motor vehicle, wherein:
   the device compares the atmospheric humidity measured by an atmospheric humidity sensor inside the vehicle with a preset atmospheric humidity warning value and generates atmospheric humidity warning information when the measured atmospheric humidity is less than the preset atmospheric humidity warning value; and
   the device receives data relevant to vehicle range from a vehicle system control and determines the anticipated vehicle range as a function of these data as well as the air conditioning system setting selected by the user.

6. The device for monitoring the air conditioning of a vehicle, wherein the device compares the outside air pollutant concentration measured by a first pollutant sensor and the inside air pollutant concentration measured by a second pollutant sensor with a preset pollutant concentration warning value and generates travel interruption recommendation information if both of the measured pollutant concentrations are above the predetermined pollutant concentration warning value.

7. A method for operating an air conditioning system of a vehicle comprising:

measuring an air pollutant concentration exterior to the vehicle;

measuring an air pollutant concentration in an interior passenger compartment of the vehicle;

comparing both measured exterior air pollutant concentration and measured interior air pollutant concentration with a preset pollutant concentration warning value;

generating a travel interruption recommendation information to a driver of the vehicle, if both of the measured pollutant concentrations are above the predetermined pollutant concentration warning value.

* * * * *